(12) United States Patent
Zhang et al.

(10) Patent No.: US 11,467,373 B2
(45) Date of Patent: Oct. 11, 2022

(54) CAMERA OPTICAL LENS

(71) Applicant: AAC Optics (Suzhou) Co., Ltd., Suzhou (CN)

(72) Inventors: Jun Zhang, Shenzhen (CN); Jia Chen, Shenzhen (CN)

(73) Assignee: AAC Optics (Suzhou) Co., Ltd., Suzhou (CN)

(*) Notice: Subject to any disclaimer, the term of this patent is extended or adjusted under 35 U.S.C. 154(b) by 156 days.

(21) Appl. No.: 17/131,750

(22) Filed: Dec. 23, 2020

(65) Prior Publication Data
US 2022/0066139 A1 Mar. 3, 2022

(30) Foreign Application Priority Data

Sep. 3, 2020 (CN) .......................... 202010918176.0

(51) Int. Cl.
*G02B 9/58* (2006.01)
*G02B 13/00* (2006.01)
*G02B 13/06* (2006.01)
(52) U.S. Cl.
CPC ............. *G02B 9/58* (2013.01); *G02B 13/004* (2013.01); *G02B 13/06* (2013.01)

(58) Field of Classification Search
CPC ......... G02B 13/004; G02B 9/58; G02B 13/06
USPC .................................................. 359/725, 782
See application file for complete search history.

(56) References Cited

U.S. PATENT DOCUMENTS

2020/0310082 A1\* 10/2020 Tseng ................... G02B 13/004

FOREIGN PATENT DOCUMENTS

CN 110989149 A \* 4/2020 ............. G02B 1/041

\* cited by examiner

*Primary Examiner* — George G. King
(74) *Attorney, Agent, or Firm* — W&G Law Group (57) ABSTRACT

A camera optical lens is provided, including, from an object side to an image side: a first lens having negative refractive power; a second having positive refractive power; a third lens having positive refractive power; and a fourth lens having negative refractive power, where the camera optical lens satisfies following conditions: $-3.00 \leq f1/f \leq -1.20$; $4.00 \leq f2/f \leq 9.00$; $15.00 \leq R4/R3$; $2.50 \leq R7/R8 \leq 6.00$; and $10.00 \leq d5/d6 \leq 20.00$. The above camera optical lens can meet design requirements for large aperture and wide angle, while obtaining high imaging quality.

10 Claims, 7 Drawing Sheets

CAMERA OPTICAL LENS

TECHNICAL FIELD

The present invention relates to the technical field of optical lens and, in particular, to a camera optical lens suitable for handheld terminal devices such as smart phones or digital cameras, and imaging devices such as monitors or PC lenses.

BACKGROUND

With the emergence of smart phones in recent years, the demand for a miniature camera lens is continuously increasing, but in general, photosensitive devices of a camera lens are nothing more than a Charge Coupled Device (CCD) or a Complementary Metal-Oxide Semiconductor Sensor (CMOS sensor), and with progress of semiconductor manufacturing technology, a pixel size of the photosensitive devices is becoming smaller, in addition, a current development trend of electronic products requires better performance with thinner and smaller dimensions, miniature camera lenses with good imaging quality therefore have become a mainstream in the market.

In order to obtain better imaging quality, a camera lens traditionally equipped in a camera of a mobile phone generally consists of three or four lenses. Although the common camera lens constituted by four lenses already has good optical performances, its configurations such as refractive power, lens spacing and lens shape still need to be optimized, therefore the camera lens may not meet design requirements for some optical performances such as large aperture and wide angle while maintaining good imaging quality.

SUMMARY

In view of the above problems, the present invention provides a camera optical lens, which can meet design requirements for large aperture and wide angle while obtaining a high imaging quality.

Embodiments of the present invention provide a camera optical lens, including from an object side to an image side:
a first lens having negative refractive power;
a second having positive refractive power;
a third lens having positive refractive power; and
a fourth lens having negative refractive power,
wherein the camera optical lens satisfies following conditions:

$-3.00 \le f1/f \le -1.20$;

$4.00 \le f2/f \le 9.00$;

$15.00 \le R4/R3$;

$2.50 \le R7/R8 \le 6.00$; and $10.00 \le d5/d6 \le 20.00$, where
f denotes a focal length of the camera optical lens;
f1 denotes a focal length of the first lens;
f2 denotes a focal length of the second lens;
R3 denotes a central curvature radius of an object side surface of the second lens;
R4 denotes a central curvature radius of an image side surface of the second lens;
R7 denotes a central curvature radius of an object side surface of the fourth lens;
R8 denotes a central curvature radius of an image side surface of the fourth lens;
d5 denotes an on-axis thickness of the third lens; and
d6 denotes an on-axis distance from an image side surface of the third lens to the object side surface of the fourth lens.

As an improvement, the camera optical lens further satisfies a following condition:

$0.50 \le d1/d2 \le 1.20$, where
d1 denotes an on-axis thickness of the first lens; and
d2 denotes an on-axis distance from an image side surface of the first lens to the object side surface of the second lens.

As an improvement, the camera optical lens further satisfies following conditions:

$0.03 \le (R1+R2)/(R1-R2) \le 2.83$; and $0.03 \le d1/TTL \le 0.16$, where
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image plane of the camera optical lens along an optic axis.

As an improvement, the camera optical lens further satisfies following conditions:

$-2.28 \le (R3+R4)/(R3-R4) \le -0.67$; and $0.07 \le d3/TTL \le 0.38$, where
d3 denotes an on-axis thickness of the second lens; and
TTL denotes a total optical length from an object side surface of the first lens to an image plane of the camera optical lens along an optic axis.

As an improvement, the camera optical lens further satisfies following conditions:

$0.30 \le f3/f \le 1.12$;

$-0.42 \le (R5+R6)/(R5-R6) \le 0.01$; and $0.08 \le d5/TTL \le 0.33$, where
f3 denotes a focal length of the third lens;
R5 denotes a central curvature radius of an object side surface of the third lens;
R6 denotes a central curvature radius of the image side surface of the third lens; and
TTL denotes a total optical length from an object side surface of the first lens to an image plane of the camera optical lens along an optic axis.

As an improvement, the camera optical lens further satisfies following conditions:

$-2.18 \le f4/f \le -0.57$;

$0.70 \le (R7+R8)/(R7-R8) \le 3.49$; and $0.03 \le d7/TTL \le 0.12$, where
f4 denotes a focal length of the fourth lens;
d7 denotes an on-axis thickness of the fourth lens; and TTL denotes a total optical length from an object side surface of the first lens to an image plane of the camera optical lens along an optic axis.

As an improvement, the camera optical lens further satisfies a following condition:

FNO≤2.05, where FNO denotes an F number of the camera optical lens.

As an improvement, the camera optical lens further satisfies a following condition:

FOV≥101°, where FOV denotes a field of view of the camera optical lens.

As an improvement, the camera optical lens further satisfies a following condition:

−34.05≤f12/f≤−0.94, where f12 denotes a combined focal length of the first lens and the second lens.

As an improvement, the camera optical lens further satisfies a following condition:

TTL≤3.76 mm, where TTL denotes a total optical length from an object side surface of the first lens to an image plane of the camera optical lens along an optic axis.

The present invention has following beneficial effects: the camera optical lens according to the present invention not only has excellent optical performances, but also has large aperture and wide-angle properties, which is especially suitable for mobile phone camera lens components composed of high-pixel CCD, CMOS and other imaging elements and WEB camera lens.

BRIEF DESCRIPTION OF DRAWINGS

Many aspects of the exemplary embodiments can be better understood with reference to following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to better illustrate the objectives, technical solutions and advantages of the present invention, the present invention will be described in further detail below with reference to the accompanying drawings and embodiments. It should be understood that the specific embodiments described herein are only used to explain the present invention but are not used to limit the present invention.

Embodiment 1

Figure 1:
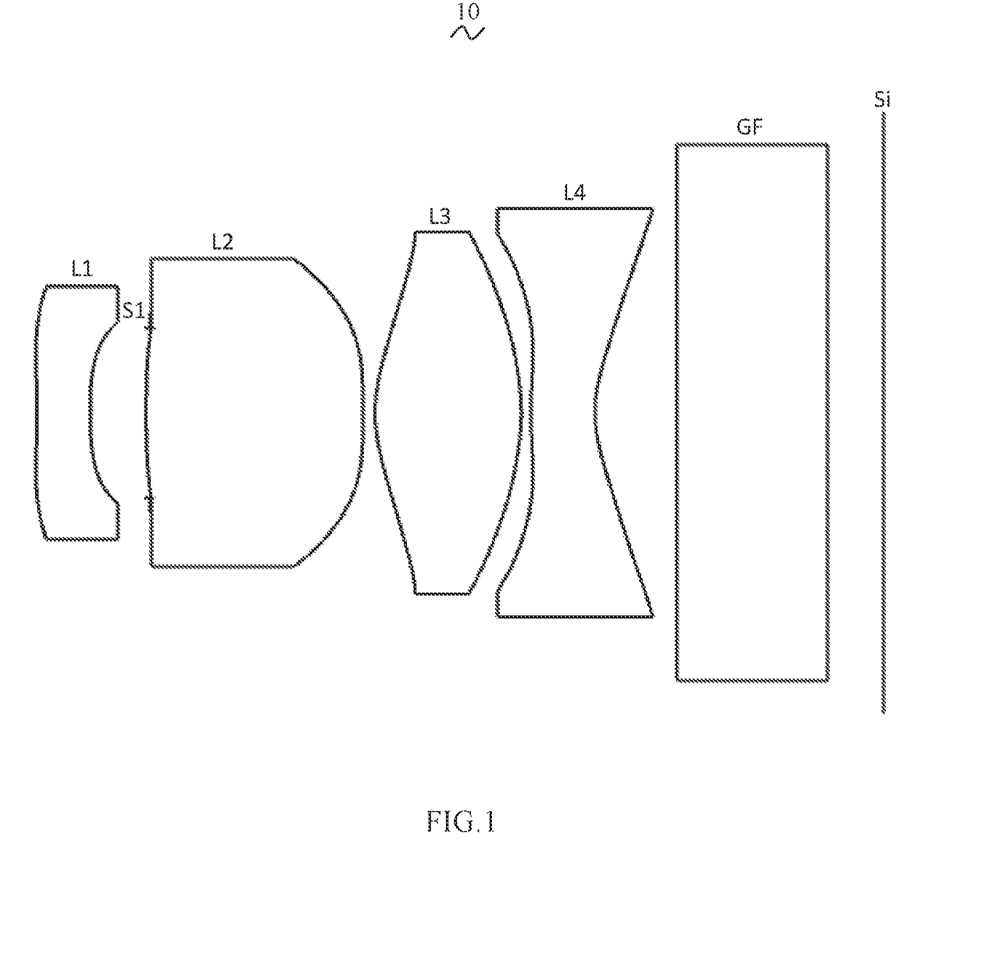
FIG. 1 is a structural schematic diagram of a camera optical lens according to Embodiment 1 of the present invention.

Referring to FIG. 1, the present invention provides a camera optical lens 10. FIG. 1 shows the camera optical lens 10 according to Embodiment 1 of the present invention. The camera optical lens 10 includes four lenses. The camera optical lens 10 includes, from an object side to an image side, a first lens L1, an aperture S1, a second lens L2, a third lens L3, and a fourth lens L4. An optical element such as an optical filter GF may be arranged between the fourth lens L4 and an image plane Si.

In this embodiment, the first lens L1 has negative refractive power, the second lens L2 has positive refractive power, the third lens L3 has a positive refractive power, and the fourth lens L4 has negative refractive power.

In this embodiment, the first lens L1, the second lens L2, the third lens L3, and the fourth lens L4 are each made of a plastic material. In other embodiments, the lenses may also be made of a material other than the plastic material.

In this embodiment, a focal length of the camera optical lens 10 is defined as f, and a focal length of the first lens L1 is defined as f1. The focal length f and the focal length f1 satisfy a following condition: −3.00≤f1/f≤−1.20, which specifies a ratio of the focal length of the first lens to a total focal length of the system. When the ratio satisfies the above condition, a spherical aberration and a field curvature of the system may be effectively balanced.

The focal length of the camera optical lens 10 is defined as f, and a focal length of the second lens L2 is defined as f2. The focal length f and the focal length f2 satisfy a following condition: 4.00≤f2/f≤9.00, which specifies a ratio of the focal length of the second lens to a total focal length of the system. With appropriate configuration of the refractive power, the system may obtain better imaging quality and lower sensitivity.

A central curvature radius of an object side surface of the second lens L2 is defined as R3, and a central curvature radius of an image side surface of the second lens L2 is defined as R4. The central curvature radius R3 and the central curvature R4 satisfy a following condition: 15.00≤R4/R3, which specifies a shape of the second lens. Within the specified range of the condition, a degree of deflection of light passing through the lens may be alleviated, and aberrations may be effectively reduced.

A central curvature radius of an object side surface of the fourth lens L4 is defined as R7, and a central curvature radius of an image side surface of the fourth lens L4 is defined as R8. The central curvature radius R7 and the central curvature R8 satisfy a following condition: 2.50≤R7/R8≤6.00, which specifies a shape of the fourth lens. Within the range of the above condition, it is beneficial to correct the aberration of off-axis angle with the development of ultra thinness and wide angle.

An on-axis thickness of the third lens L3 is defined as d5, and an on-axis distance from an image side surface of the third lens L3 to the object side surface of the fourth lens L4 is defined as d6. The on-axis thickness d5 and the on-axis distance d6 satisfy a following condition: $10.00 \leq d5/d6 \leq 20.00$, which specifies a ratio of the thickness of the third lens to an air spacing between the third lens and the fourth lens. Within the range of the above condition, it is beneficial to compress a total length of the optical system, thereby achieving an ultra-thinness effect.

An on-axis thickness of the first lens L1 is defined as d1, and an on-axis distance from an image side surface of the first lens L1 to an object side surface of the second lens L2 is d2. The on-axis thickness d1 and the on-axis distance d2 satisfy a following condition: $0.50 \leq d1/d2 \leq 1.20$, which specifies a ratio of the thickness of the first lens to an air spacing between the first lens and the second lens. Within the range of the above condition, it is beneficial to compress a total length of the optical system, thereby achieving an ultra-thinness effect.

In this embodiment, the object side surface of the first lens L1 is concave at a paraxial region, and the image side surface of the first lens L1 is concave in the paraxial region.

A central curvature radius of the object side surface of the first lens L1 is defined as R1, and a central curvature radius of the image side surface of the first lens L1 is defined as R2. The central curvature radius R1 and the central curvature R2 satisfy a following condition: $0.03 \leq (R1+R2)/(R1-R2) \leq 2.83$. The shape of the first lens L1 is reasonably controlled so that the first lens L1 may effectively correct spherical aberration of the system. Optionally, the central curvature radius R1 and the central curvature R2 satisfy a following condition: $0.05 \leq (R1+R2)/(R1-R2) \leq 2.26$.

The on-axis thickness of the first lens L1 is defined as d1, and a total optical length from the object side surface of the first lens to an image plane of the camera optical lens 10 along an optic axis is defined as TTL. The on-axis thickness d1 and the total optical length TTL satisfy a following condition: $0.03 \leq d1/TTL \leq 0.16$. Within the range of the above condition, it is beneficial to achieve an ultra-thinness effect. Optionally, the on-axis thickness d1 and the total optical length TTL satisfy a following condition: $0.05 \leq d1/TTL \leq 0.13$.

In this embodiment, the object side surface of the second lens L2 is convex in a paraxial region, and the image side surface of the second lens L2 is concave in the paraxial region.

A central curvature radius of the object side surface of the second lens L2 is defined as R3, and a central curvature radius of the image side surface of the second lens L2 is defined as R4. The central curvature radius R3 and the central curvature R4 satisfy a following condition: $-2.28 \leq (R3+R4)/(R3-R4) \leq -0.67$, which specifies a shape of the second lens L2. Within the range of the above condition, as the lens becomes ultra thinness and wide angle, it is beneficial to correct on-axis chromatic aberration. Optionally, the central curvature radius R3 and the central curvature R4 satisfy a following condition: $-1.43 \leq (R3+R4)/(R3-R4) \leq -0.83$.

An on-axis thickness of the second lens L2 is defined as d3, and a total optical length from the object side surface of the first lens to an image plane of the camera optical lens 10 along an optic axis is defined as TTL. The on-axis thickness d3 and the total optical length TTL satisfy a following condition: $0.07 \leq d3/TTL \leq 0.38$. Within the range of the above condition, it is beneficial to achieve an ultra-thinness effect. Optionally, the on-axis thickness d3 and the total optical length TTL satisfy a following condition: $0.12 \leq d3/TTL \leq 0.31$.

In this embodiment, the object side surface of the third lens L3 is convex in a paraxial region, and the image side surface of the third lens L3 is convex in the paraxial region.

A focal length of the third lens L3 is defined as f3, and the focal length of the camera optical lens 10 is defined as f. The focal length f3 and the focal length f satisfy a following condition: $0.30 \leq f3/f \leq 1.12$. With appropriate configuration of the refractive power, the system may obtain better imaging quality and lower sensitivity. Optionally, the focal length f3 and the focal length f satisfy a following condition: $0.47 \leq f3/f \leq 0.90$.

A central curvature radius of an object side surface of the third lens L3 is defined as R5, and a central curvature radius of the image side surface of the third lens L3 is defined as R6. The central curvature radius R5 and the central curvature R6 satisfy a following condition: $-0.42 \leq (R5+R6)/(R5-R6) \leq 0.01$. Within the specified range of the condition, a degree of deflection of light passing through the lens may be alleviated, and aberrations may be effectively reduced. Optionally, the central curvature radius R5 and the central curvature R6 satisfy a following condition: $-0.26 \leq (R5+R6)/(R5-R6) \leq 0.01$.

An on-axis thickness of the third lens L3 is defined as d5, and a total optical length from the object side surface of the first lens to an image plane of the camera optical lens 10 along an optic axis is defined as TTL. The on-axis thickness d5 and the total optical length TTL satisfy a following condition: $0.08 \leq d5/TTL \leq 0.33$. Within the range of the above condition, it is beneficial to achieve an ultra-thinness effect. Optionally, the on-axis thickness d5 and the total optical length TTL satisfy a following condition: $0.13 \leq d5/TTL \leq 0.26$.

In this embodiment, the object side surface of the fourth lens L4 is convex in a paraxial region, and the image side surface of the fourth lens L4 is concave in the paraxial region.

A focal length of the fourth lens L4 is defined as f4, and the focal length of the camera optical lens 10 is defined as f. The focal length f4 and the focal length f satisfy a following condition: $-2.18 \leq f4/f \leq -0.57$, which specifies a ratio of the focal length of the fourth lens to the focal length of the system. Within the range of the above condition, it is beneficial to improve optical performances of the system. Optionally, the focal length f4 and the focal length f satisfy a following condition: $-1.36 \leq f4/f \leq -0.71$.

A central curvature radius of an object side surface of the fourth lens L4 is defined as R7, and a central curvature radius of the image side surface of the fourth lens L4 is defined as R8. The central curvature radius R7 and the central curvature R8 satisfy a following condition: $0.70 \leq (R7+R8)/(R7-R8) \leq 3.49$, which specifies a shape of the fourth lens L4. Within the range of the above condition, it is beneficial to correct the aberration of off-axis angle with the development of ultra thinness and wide angle. Optionally, the central curvature radius R7 and the central curvature R8 satisfy a following condition: $1.12 \leq (R7+R8)/(R7-R8) \leq 2.80$.

An on-axis thickness of the fourth lens L4 is defined as d7, and a total optical length from the object side surface of the first lens to an image plane of the camera optical lens 10 along an optic axis is defined as TTL. The on-axis thickness d7 and the total optical length TTL satisfy a following condition: $0.03 \leq d7/TTL \leq 0.12$. Within the range of the above condition, it is beneficial to achieve an ultra-thinness effect. Optionally, the on-axis thickness d7 and the total optical length TTL satisfy a following condition: $0.06 \leq d7/TTL \leq 0.10$.

In this embodiment, a field of view FOV of the camera optical lens 10 is greater than or equal to 101°, so that a wide-angle effect is achieved.

In this embodiment, an F number FNO of the camera optical lens 10 is less than or equal to 2.05, so that a large aperture is achieved, thereby obtaining a good imaging quality of the camera optical lens.

In this embodiment, TTL of the camera optical lens 10 is less than or equal to 3.76 mm, which is beneficial to achieve an ultra-thinness effect.

In this embodiment, the focal length of the camera optical lens 10 is defined as f, and a combined focal length of the first lens L1 and the second lens L2 is f12. The focal length f and the focal length f12 satisfy a following condition: $-34.05 \leq f12/f \leq -0.94$. Within the range of the above condition, the aberration and distortion of the camera optical lens 10 may be eliminated, and a back focal length of the camera optical lens 10 may be suppressed, so that miniaturization of an imaging lens system may be maintained. Optionally, the camera optical lens 10 satisfies a following condition: $-21.28 \leq f12/f \leq -1.18$.

When the above conditions are satisfied, the camera optical lens 10 may meet the design requirements for large aperture and wide angle while maintaining good optical performance. According to properties of the camera optical lens 10, the camera optical lens 10 is especially suitable for mobile phone camera lens components composed of high-pixel CCD, CMOS and other imaging elements and WEB camera lens.

The camera optical lens 10 of the present invention will be described below with examples. The symbols recorded in each example will be described as follows. The focal length, on-axis distance, central curvature radius, on-axis thickness, inflection point position, and arrest point position are each in unit of millimeter (mm).

TTL denotes a total optical length (on-axis distance from the object side surface of the first lens L1 to the image plane), with a unit of millimeter (mm);

F number FNO denotes a ratio of an effective focal length of the camera optical lens to an entrance pupil diameter.

Optionally, the object side surface and/or the image side surface of the lens may be provided with inflection points and/or arrest points in order to meet high-quality imaging requirements. The description below may be referred to in specific embodiments as follows.

Design data of the camera optical lens 10 according to Embodiment 1 of the present invention are shown in Tables 1 and 2.

TABLE 1

|  | R |  | d | nd |  | Vd |
|---|---|---|---|---|---|---|
| S1 | ∞ | d0= | -0.454 |  |  |  |
| R1 | -2.547 | d1= | 0.214 | nd1 | 1.6153 v1 | 25.94 |
| R2 | 2.242 | d2= | 0.226 |  |  |  |
| R3 | 4.496 | d3= | 0.876 | nd2 | 1.5346 v2 | 55.69 |
| R4 | 123.556 | d4= | 0.049 |  |  |  |
| R5 | 0.621 | d5= | 0.591 | nd3 | 1.5346 v3 | 55.69 |
| R6 | -0.955 | d6= | 0.040 |  |  |  |
| R7 | 2.145 | d7= | 0.258 | nd4 | 1.6700 v4 | 19.39 |
| R8 | 0.554 | d8= | 0.330 |  |  |  |

TABLE 1-continued

|  | R |  | d | nd |  | Vd |
|---|---|---|---|---|---|---|
| R9 | ∞ | d9= | 0.610 | ndg | 1.5168 vg | 64.17 |
| R10 | ∞ | d10= | 0.227 |  |  |  |

Each symbol is explained is as follows.

S1: aperture;
R: central curvature radius of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the optical filter GF;
R10: central curvature radius of the image side surface of the optical filter GF;
d: on-axis thickness of a lens and an on-axis distance between lenses;
d0: on-axis distance from the aperture Si to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the optical filter GF;
d9: on-axis thickness of the optical filter GF;
d10: on-axis distance from the image side surface of the optical filter GF to the image plane;
nd: refractive index of a d-line;
nd1: refractive index of the d-line of the first lens L1;
nd2: refractive index of the d-line of the second lens L2;
nd3: refractive index of the d-line of the third lens L3;
nd4: refractive index of the d-line of the fourth lens L4;
ndg: refractive index of the d-line of the optical filter GF;
vd: Abbe number;
v1: Abbe number of the first lens L1;
v2: Abbe number of the second lens L2;
v3: Abbe number of the third lens L3;
v4: Abbe number of the fourth lens L4;
vg: Abbe number of the optical filter GF.

Table 2 shows aspherical surface data of each lens in the camera optical lens 10 according to Embodiment 1 of the present invention.

TABLE 2

| | Conic coefficient | Aspherical surface coefficient | | | | |
|---|---|---|---|---|---|---|
| | k | A4 | A6 | A8 | A10 | A12 |
| R1 | −6.5466E+01 | 1.7217E+00 | −7.1013E+00 | 5.7505E+01 | −5.1135E+02 | 3.3151E+03 |
| R2 | 4.9711E+00 | 3.7563E+00 | −3.3654E+01 | 1.3132E+03 | −3.0853E+04 | 4.5348E+05 |
| R3 | 3.2019E+01 | 4.3098E−01 | 3.4667E+00 | −2.9744E+02 | 7.4932E+03 | −1.0079E+05 |
| R4 | −1.8823E+02 | −5.0785E+00 | 3.3772E+01 | −2.2963E+02 | 1.2377E+03 | −4.7314E+03 |
| R5 | −8.8354E+00 | 1.0156E−02 | −2.0269E+00 | 1.4194E+01 | −6.4267E+01 | 2.1713E+02 |
| R6 | −6.6830E−01 | 2.3586E+00 | −2.0524E+01 | 1.1331E+02 | −4.2641E+02 | 1.1669E+03 |
| R7 | −1.9900E+02 | 3.6545E−01 | −2.6116E+01 | 2.1433E+02 | −9.8895E+02 | 2.9950E+03 |
| R8 | −8.2584E−01 | −3.8930E+00 | 1.5607E+01 | −4.8510E+01 | 1.1352E+02 | −1.9827E+02 |
| | Conic coefficient | Aspherical surface coefficient | | | | |
| | k | A14 | A16 | A18 | A20 | |
| R1 | −6.5466E+01 | −1.4003E+04 | 3.6422E+04 | −5.2972E+04 | 3.2975E+04 | |
| R2 | 4.9711E+00 | −4.1609E+06 | 2.3230E+07 | −7.1853E+07 | 9.4096E+07 | |
| R3 | 3.2019E+01 | 8.1228E+05 | −4.1088E+06 | 1.2719E+07 | −1.8991E+07 | |
| R4 | −1.8823E+02 | 1.2115E+04 | −1.9734E+04 | 1.8546E+04 | −7.6863E+03 | |
| R5 | −8.8354E+00 | −4.9619E+02 | 6.6369E+02 | −4.4134E+02 | 1.0050E+02 | |
| R6 | −6.6830E−01 | −2.2711E+03 | 2.8888E+03 | −2.1052E+03 | 6.6270E+02 | |
| R7 | −1.9900E+02 | −6.0658E+03 | 7.8464E+03 | −5.8111E+03 | 1.8657E+03 | |
| R8 | −8.2584E−01 | 2.4554E+02 | −2.0007E+02 | 9.5104E+01 | −1.9848E+01 | |

Here, k denotes a conic coefficient, and A4, A6, A8, A10, A12, A14, A16, A18, and A20 denote an aspherical coefficient, respectively.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

Here, x denotes a vertical distance between a point on an aspherical curve and the optical axis, and y denotes a depth of the aspherical surface, i.e., a vertical distance between a point on the aspherical surface having a distance x from the optical axis and a tangent plane tangent to a vertex on an aspherical optical axis.

For convenience, the aspherical surface of each lens surface uses the aspherical surface shown in the above formula (1). However, the present invention is not limited to the aspherical polynomial form shown in the formula (1).

Design data of the inflection point and the arrest point of each lens in the camera optical lens 10 according to Embodiment 1 of the present invention are shown in Tables 3 and 4. Here, P1R1 and P1R2 denote the object side surface and image side surface of the first lens L1, respectively. P2R1 and P2R2 denote the object side surface and image side surface of the second lens L2, respectively. P3R1 and P3R2 denote the object side surface and image side surface of the third lens L3, respectively. P4R1 and P4R2 denote the object side surface and image side surface of the fourth lens L4, respectively. Data in an "inflection point position" column is a vertical distance from an inflection point provided on a surface of each lens to the optical axis of the camera optical lens 10. Data in an "arrest point position" column is a vertical distance from an arrest point provided on the surface of each lens to the optical axis of the camera optical lens 10.

TABLE 3

| | Number of inflexion points | Inflexion point position 1 | Inflexion point position 2 |
|---|---|---|---|
| P1R1 | 1 | 0.135 | / |
| P1R2 | 0 | / | / |
| P2R1 | 1 | 0.375 | / |
| P2R2 | 1 | 0.015 | / |
| P3R1 | 1 | 0.385 | / |
| P3R2 | 1 | 0.705 | / |

TABLE 3-continued

| | Number of inflexion points | Inflexion point position 1 | Inflexion point position 2 |
|---|---|---|---|
| P4R1 | 2 | 0.155 | 0.735 |
| P4R2 | 2 | 0.655 | 0.905 |

TABLE 4

| | Number of arrest points | Arrest point position 1 |
|---|---|---|
| P1R1 | 1 | 0.245 |
| P1R2 | 0 | / |
| P2R1 | 0 | / |
| P2R2 | 1 | 0.025 |
| P3R1 | 1 | 0.765 |
| P3R2 | 1 | 0.795 |
| P4R1 | 1 | 0.255 |
| P4R2 | 0 | / |

Figure 2:
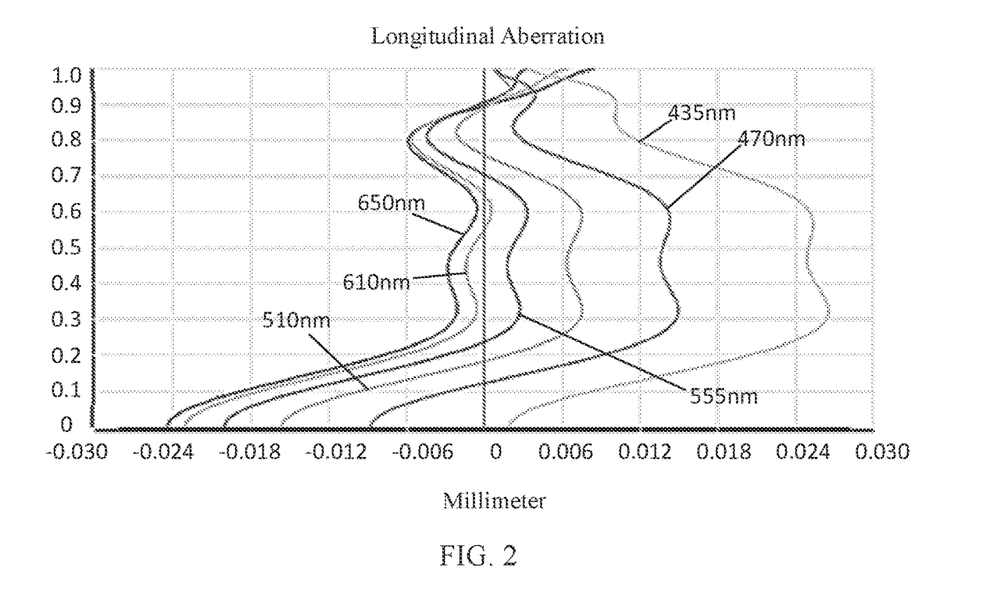
FIG. 2 is a schematic diagram of a longitudinal aberration of the camera optical lens shown in FIG. 1.
Figure 3:
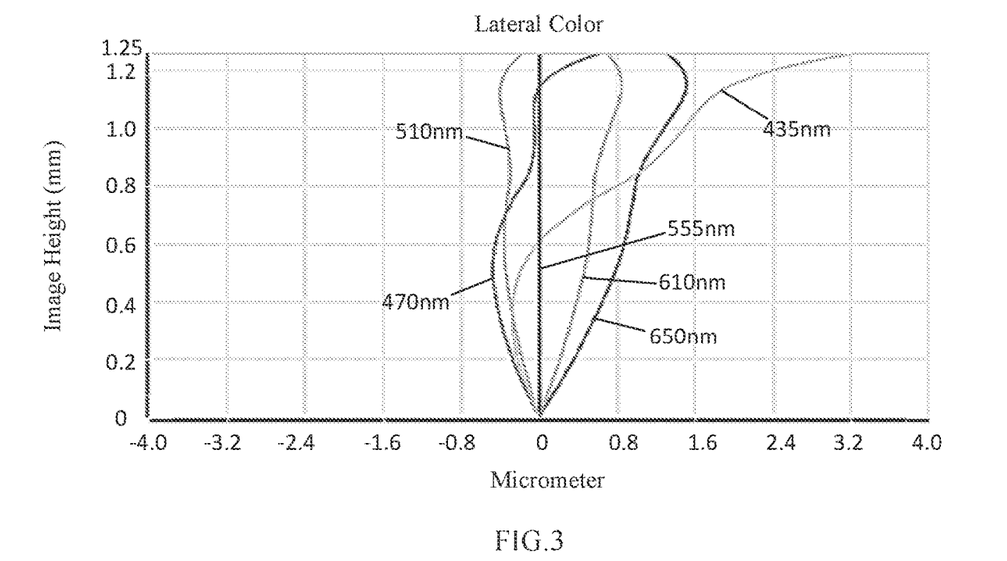
FIG. 3 is a schematic diagram of a lateral color of the camera optical lens shown in FIG. 1.
Figure 4:
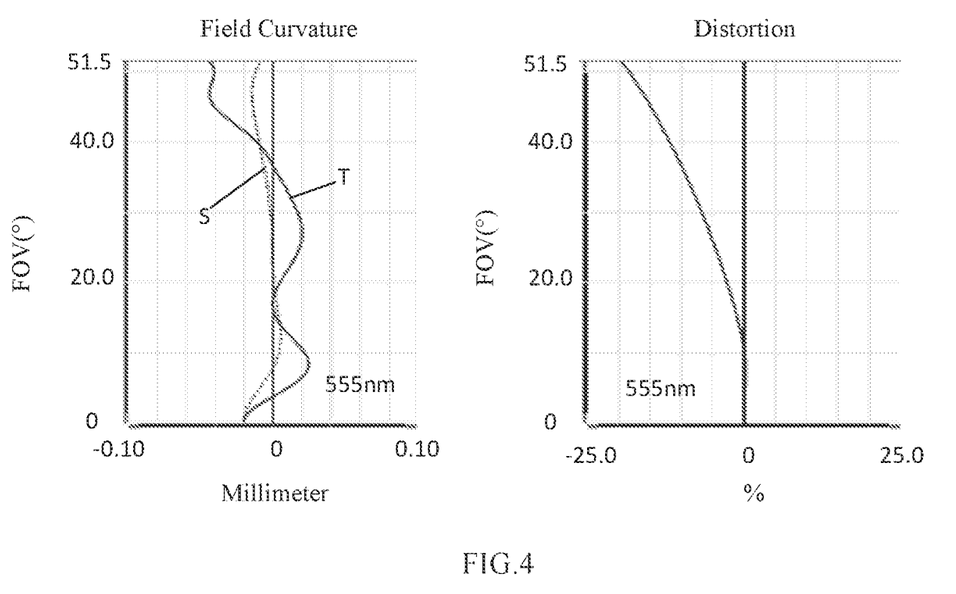
FIG. 4 is a schematic diagram of a field curvature and a distortion of the camera optical lens shown in FIG. 1.

FIG. 2 and FIG. 3 are schematic diagrams of a longitudinal aberration and a lateral color of the camera optical lens 10 after light having a wavelength of 650 nm, 610 nm, 555 nm, 510 nm, 470 nm, and 435 nm passes through the camera optical lens 10 according to Embodiment 1, respectively. FIG. 4 is a schematic diagram of a field curvature and a distortion of the camera optical lens 10 after light having a wavelength of 555 nm passes through the camera optical lens 10 according to Embodiment 1. A field curvature S in FIG. 4 is a field curvature in a sagittal direction, and T is a field curvature in a meridian direction.

Table 13 below shows numerical values corresponding to various numerical values in Embodiments 1, 2, and 3 and parameters specified in the conditions.

As shown in Table 13, Embodiment 1 satisfies various conditions.

In this embodiment, an entrance pupil diameter ENPD of the camera optical lens is 0.613 mm, a full-field image height IH is 1.260 mm, and a field of view FOV in a diagonal direction is 103.00°. The camera optical lens 10 satisfies design requirements for large aperture and wide angle. Its on-axis and off-axis chromatic aberrations are fully corrected, thereby achieving excellent optical performances.

Embodiment 2

Figure 5:
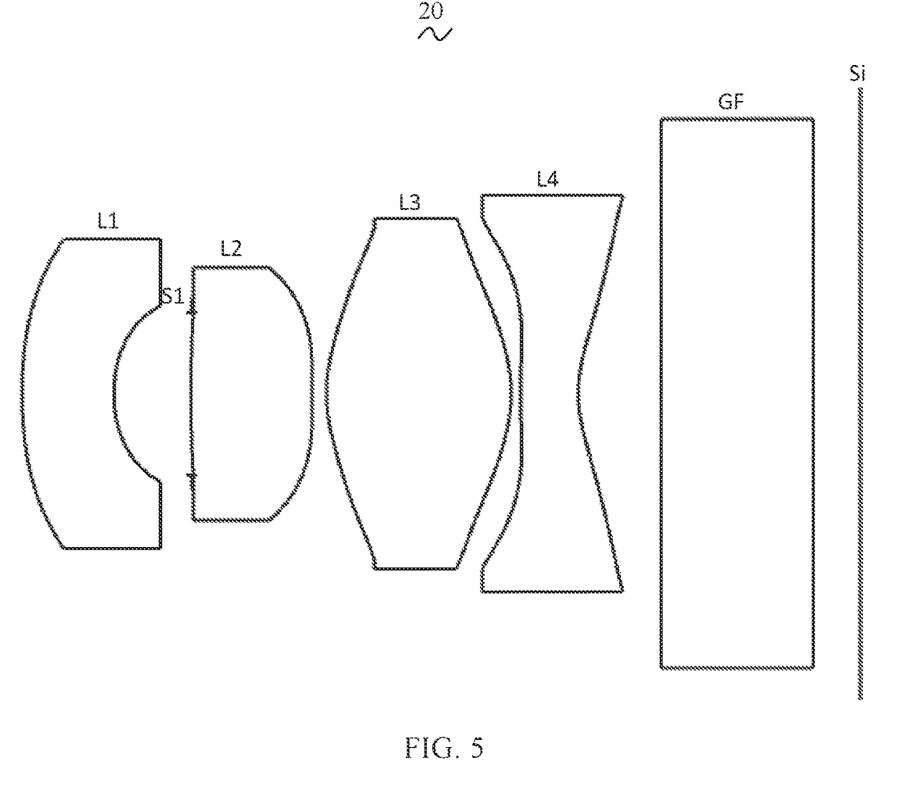
FIG. 5 is a structural schematic diagram of a camera optical lens according to Embodiment 2 of the present invention.

Embodiment 2 is basically the same as Embodiment 1, and involves symbols having the same meanings as Embodiment 1, and only differences therebetween are listed below. FIG. 5 shows a camera optical lens 20 according to Embodiment 2 of the present invention.

In this embodiment, an object side surface of a first lens L1 is convex in the paraxial region.

Design data of the camera optical lens 20 according to Embodiment 2 of the present invention are shown in Tables 5 and 6.

TABLE 5

|     | R      | d    |        | nd     |     | vd    |
|-----|--------|------|--------|--------|-----|-------|
| S1  | ∞      | d0=  | −0.679 |        |     |       |
| R1  | 1.816  | d1=  | 0.368  | nd1    | 1.6153 | v1 | 25.94 |
| R2  | 0.558  | d2=  | 0.309  |        |     |       |
| R3  | 5.493  | d3=  | 0.485  | nd2    | 1.5346 | v2 | 55.69 |
| R4  | 82.840 | d4=  | 0.056  |        |     |       |
| R5  | 0.601  | d5=  | 0.739  | nd3    | 1.5346 | v3 | 55.69 |
| R6  | −0.620 | d6=  | 0.037  |        |     |       |
| R7  | 3.378  | d7=  | 0.231  | nd4    | 1.6700 | v4 | 19.39 |
| R8  | 0.564  | d8=  | 0.330  |        |     |       |
| R9  | ∞      | d9=  | 0.610  | ndg    | 1.5168 | vg | 64.17 |
| R10 | ∞      | d10= | 0.190  |        |     |       |

Table 6 shows aspherical surface data of each lens in the camera optical lens 20 according to Embodiment 2 of the present invention.

TABLE 6

| | Conic coefficient | Aspherical surface coefficient | | | | |
|---|---|---|---|---|---|---|
| | K | A4 | A6 | A8 | A10 | A12 |
| R1 | −3.3638E+01 | 1.2039E+00 | −6.5444E+00 | 6.0213E+01 | −5.1269E+02 | 3.2880E+03 |
| R2 | −9.5611E+00 | 6.9613E+00 | −4.0468E+01 | 1.1726E+03 | −2.9757E+04 | 4.6063E+05 |
| R3 | −9.4334E+02 | 3.8571E−01 | 3.0435E+00 | −2.8862E+02 | 7.4850E+03 | −1.0120E+05 |
| R4 | 6.3825E+02 | −5.0576E+00 | 3.2222E+01 | −2.2791E+02 | 1.2449E+03 | −4.7393E+03 |
| R5 | −9.5830E+00 | 1.5268E−01 | −1.6595E+00 | 1.4149E+01 | −6.5597E+01 | 2.1629E+02 |
| R6 | −1.3905E+00 | 2.6447E+00 | −2.0448E+01 | 1.1331E+02 | −4.2618E+02 | 1.1654E+03 |
| R7 | −3.2672E+02 | 3.5218E−01 | −2.6369E+01 | 2.1418E+02 | −9.8920E+02 | 2.9952E+03 |
| R8 | −8.5224E−01 | −4.0071E+00 | 1.5617E+01 | −4.8404E+01 | 1.1354E+02 | −1.9820E+02 |

| | Conic coefficient | Aspherical surface coefficient | | | |
|---|---|---|---|---|---|
| | K | A14 | A16 | A18 | A20 |
| R1 | −3.3638E+01 | −1.4030E+04 | 3.6601E+04 | −5.2397E+04 | 3.1430E+04 |
| R2 | −9.5611E+00 | −4.1769E+06 | 2.2930E+07 | −7.3203E+07 | 1.0916E+08 |
| R3 | −9.4334E+02 | 8.1043E+05 | −4.0924E+06 | 1.2853E+07 | −1.9479E+07 |
| R4 | 6.3825E+02 | 1.2024E+04 | −1.9961E+04 | 1.8672E+04 | −3.9747E+03 |
| R5 | −9.5830E+00 | −4.9357E+02 | 6.6666E+02 | −4.5069E+02 | 1.0749E+02 |
| R6 | −1.3905E+00 | −2.2728E+03 | 2.8870E+03 | −2.1037E+03 | 6.7645E+02 |
| R7 | −3.2672E+02 | −6.0644E+03 | 7.8529E+03 | −5.8058E+03 | 1.8468E+03 |
| R8 | −8.5224E−01 | 2.4558E+02 | −2.0006E+02 | 9.4973E+01 | −1.9712E+01 |

Design data of the inflection point and the arrest point of each lens in the camera optical lens 20 according to Embodiment 2 of the present invention are shown in Tables 7 and 8.

TABLE 7

| | Number of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 1 | 0.395 | / | / |

TABLE 7-continued

| | Number of inflexion points | Inflexion point position 1 | Inflexion point position 2 | Inflexion point position 3 |
|---|---|---|---|---|
| P2R2 | 2 | 0.015 | 0.535 | / |
| P3R1 | 1 | 0.585 | / | / |
| P3R2 | 3 | 0.445 | 0.595 | 0.695 |
| P4R1 | 2 | 0.145 | 0.665 | / |
| P4R2 | 2 | 0.285 | 0.685 | / |

TABLE 8

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 1 | 0.025 | / |
| P3R1 | 1 | 0.785 | / |
| P3R2 | 1 | 0.755 | / |
| P4R1 | 2 | 0.235 | 0.775 |
| P4R2 | 0 | / | / |

Figure 6:
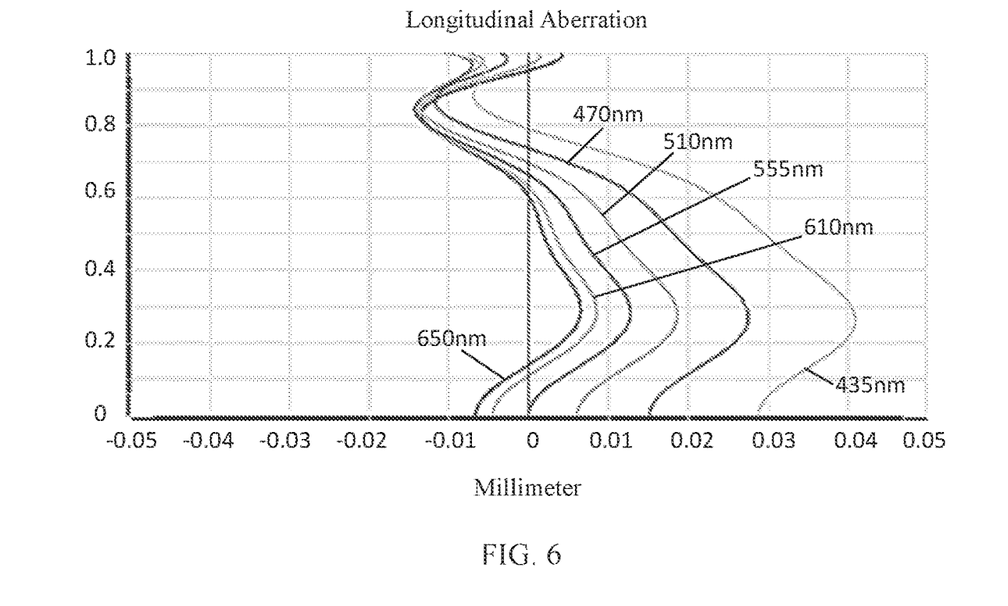
FIG. 6 is a schematic diagram of a longitudinal aberration of the camera optical lens shown in FIG. 5.
Figure 7:
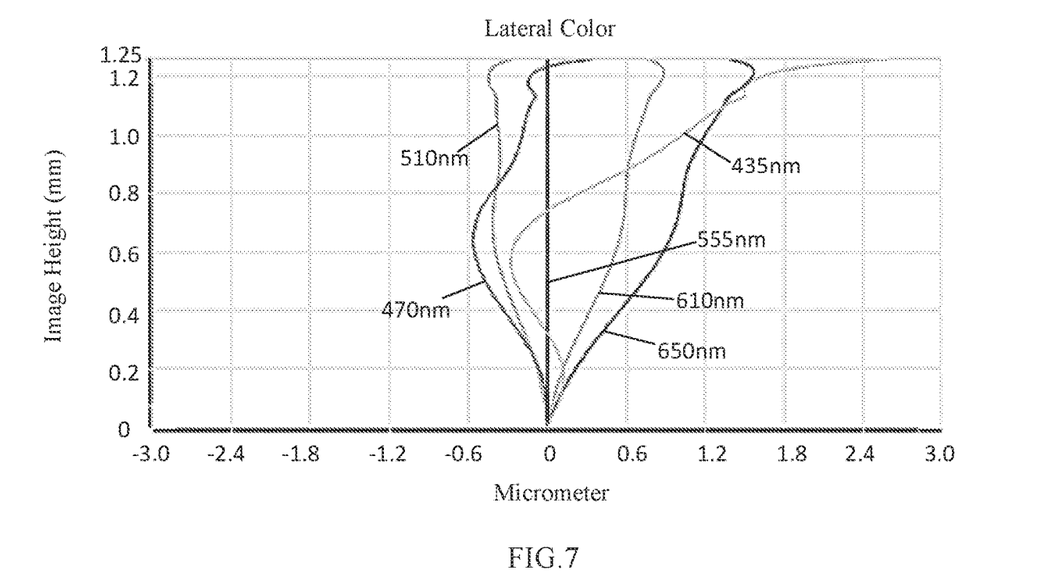
FIG. 7 is a schematic diagram of a lateral color of the camera optical lens shown in FIG. 5.
Figure 8:
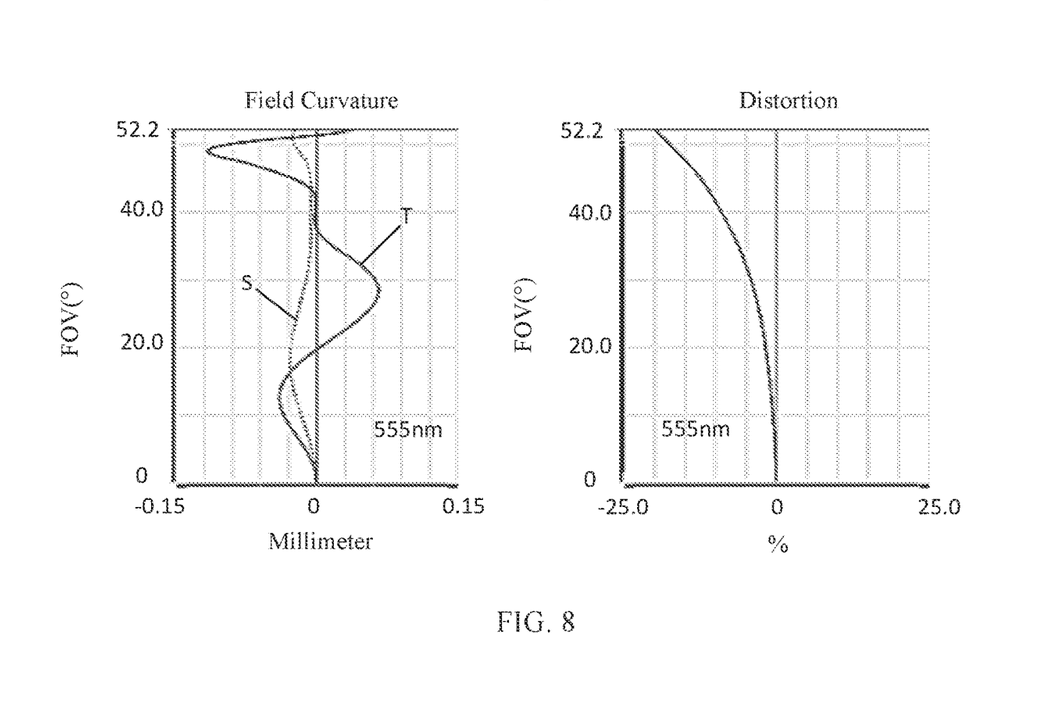
FIG. 8 is a schematic diagram of a field curvature and a distortion of the camera optical lens shown in FIG. 5.

FIG. 6 and FIG. 7 are schematic diagrams of a longitudinal aberration and a lateral color of the camera optical lens 20 after light having a wavelength of 650 nm, 610 nm, 555 nm, 510 nm, 470 nm, and 435 nm passes through the camera optical lens 20 according to Embodiment 2, respectively. FIG. 8 is a schematic diagram of a field curvature and a distortion after light having a wavelength of 555 nm passes through the camera optical lens 20 according to Embodiment 2.

As shown in Table 13, Embodiment 2 satisfies various conditions.

In this embodiment, an entrance pupil diameter ENPD of the camera optical lens is 0.594 mm, a full-field image height IH is 1.260 mm, and a field of view FOV in a diagonal direction is 104.40°. The camera optical lens 20 satisfies design requirements for large aperture and wide angle. Its on-axis and off-axis chromatic aberrations are fully corrected, thereby achieving excellent optical performances.

Embodiment 3

Figure 9:
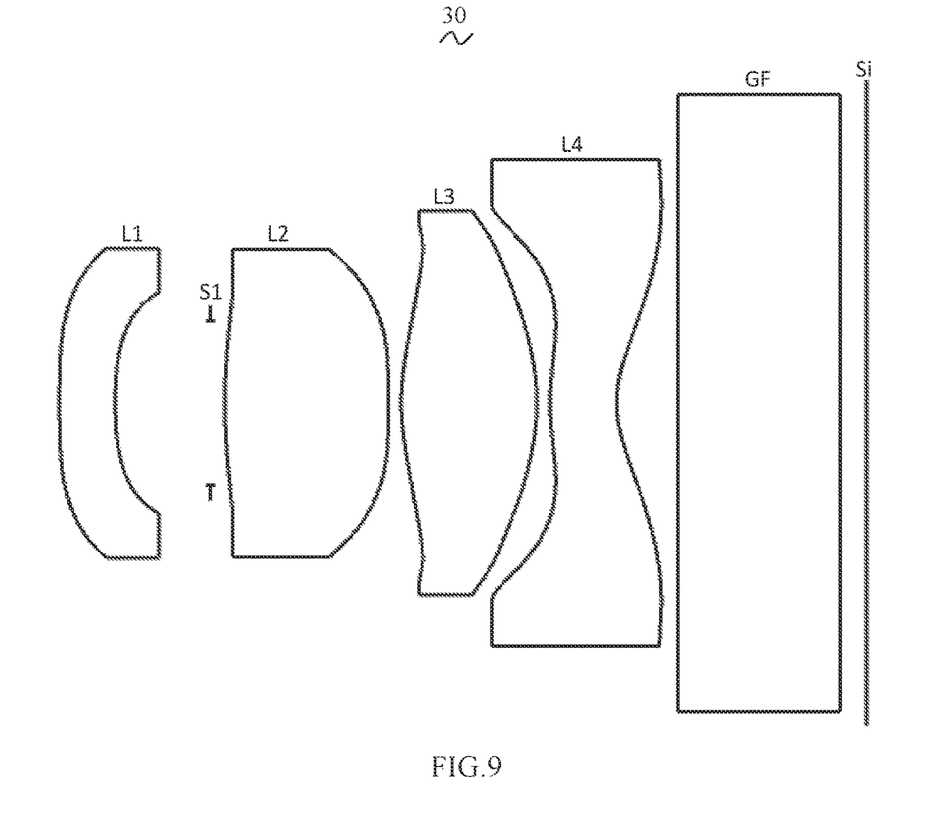
FIG. 9 is a structural schematic diagram of a camera optical lens according to Embodiment 3 of the present invention.

Embodiment 3 is basically the same as Embodiment 1, and involves symbols having the same meanings as Embodiment 1, and only differences therebetween are listed below. FIG. 9 shows a camera optical lens 30 according to Embodiment 3 of the present invention.

In this embodiment, an object side surface of a first lens L1 is convex in a paraxial region.

Design data of the camera optical lens 30 of Embodiment 3 of the present invention are shown in Tables 9 and 10.

TABLE 9

|     | R           | d    |        | nd     |     | vd    |
| --- | ----------- | ---- | ------ | ------ | --- | ----- |
| S1  | ∞           | d0=  | −0.567 |        |     |       |
| R1  | 13.294      | d1=  | 0.209  | 1.6153 | v1  | 25.94 |
| R2  | 1.905       | d2=  | 0.412  |        |     |       |
| R3  | 2.605       | d3=  | 0.614  | 1.5346 | v2  | 55.69 |
| R4  | 36690810.000| d4=  | 0.049  |        |     |       |
| R5  | 0.876       | d5=  | 0.509  | 1.5346 | v3  | 55.69 |
| R6  | −0.868      | d6=  | 0.050  |        |     |       |
| R7  | 1.147       | d7=  | 0.250  | 1.6700 | v4  | 19.39 |
| R8  | 0.458       | d8=  | 0.230  |        |     |       |
| R9  | ∞           | d9=  | 0.610  | 1.5168 | vg  | 64.17 |
| R10 | ∞           | d10= | 0.098  |        |     |       |

Table 10 shows aspherical surface data of each lens in the camera optical lens 30 according to Embodiment 3 of the present invention.

TABLE 10

|    | Conic coefficient | Aspherical surface coefficient |             |             |             |             |
| -- | ----------------- | ------------ | ------------ | ------------ | ------------ | ------------ |
|    | k                 | A4           | A6           | A8           | A10          | A12          |
| R1 | 3.2971E+02        | 1.9178E+00   | −8.4887E+00  | 6.5423E+01   | −5.1123E+02  | 3.2804E+03   |
| R2 | 5.8712E+00        | 3.5456E+00   | −4.7637E+01  | 1.4443E+03   | −3.1037E+04  | 4.5099E+05   |
| R3 | −4.6678E+00       | 1.1475E−01   | 3.7821E−01   | −2.7644E+02  | 7.5441E+03   | −1.0120E+05  |
| R4 | 1.9941E+02        | −4.7264E+00  | 3.2884E+01   | −2.2900E+02  | 1.2370E+03   | −4.7369E+03  |
| R5 | −1.8017E+01       | −2.3246E−01  | −1.0199E+00  | 1.4055E+01   | −6.6640E+01  | 2.1406E+02   |
| R6 | −3.3852E−01       | 1.9899E+00   | −1.7990E+01  | 1.1030E+02   | −4.2798E+02  | 1.1690E+03   |
| R7 | −2.1326E+01       | −2.6402E−02  | −2.6822E+01  | 2.1452E+02   | −9.8951E+02  | 2.9957E+03   |
| R8 | −1.1037E+00       | −4.2477E+00  | 1.5783E+01   | −4.8141E+01  | 1.1360E+02   | −1.9871E+02  |

|    | Conic coefficient | Aspherical surface coefficient |             |             |             |
| -- | ----------------- | ------------ | ------------ | ------------ | ------------ |
|    | k                 | A14          | A16          | A18          | A20          |
| R1 | 3.2971E+02        | −1.4104E+04  | 3.6713E+04   | −5.1693E+04  | 3.0059E+04   |
| R2 | 5.8712E+00        | −4.1743E+06  | 2.3263E+07   | −7.0486E+07  | 8.8943E+07   |
| R3 | −4.6678E+00       | 8.0390E+05   | −3.9490E+06  | 1.1305E+07   | −1.4431E+07  |
| R4 | 1.9941E+02        | 1.2082E+04   | −1.9740E+04  | 1.8840E+04   | −7.5443E+03  |
| R5 | −1.8017E+01       | −5.0027E+02  | 6.6328E+02   | −4.3142E+02  | 1.4607E+02   |
| R6 | −3.3852E−01       | −2.2694E+03  | 2.8842E+03   | −2.1171E+03  | 6.9510E+02   |
| R7 | −2.1326E+01       | −6.0620E+03  | 7.8540E+03   | −5.8080E+03  | 1.8424E+03   |
| R8 | −1.1037E+00       | 2.4530E+02   | −1.9979E+02  | 9.5575E+01   | −2.0190E+01  |

Design data of the inflection point and the arrest point of each lens in the camera optical lens 30 according to Embodiment 3 of the present invention are shown in Tables 11 and 12.

TABLE 11

|      | Number of inflexion points | Inflexion point position 1 | Inflexion point position 2 |
| ---- | -------------------------- | -------------------------- | -------------------------- |
| P1R1 | 0                          | /                          | /                          |
| P1R2 | 0                          | /                          | /                          |
| P2R1 | 0                          | /                          | /                          |
| P2R2 | 1                          | 0.585                      | /                          |
| P3R1 | 2                          | 0.325                      | 0.685                      |
| P3R2 | 1                          | 0.715                      | /                          |
| P4R1 | 2                          | 0.175                      | 0.675                      |
| P4R2 | 2                          | 0.285                      | 0.875                      |

TABLE 12

|      | Number of arrest points | Arrest point position 1 | Arrest point position 2 |
| ---- | ----------------------- | ----------------------- | ----------------------- |
| P1R1 | 0                       | /                       | /                       |
| P1R2 | 0                       | /                       | /                       |
| P2R1 | 0                       | /                       | /                       |
| P2R2 | 0                       | /                       | /                       |
| P3R1 | 1                       | 0.605                   | /                       |
| P3R2 | 0                       | /                       | /                       |
| P4R1 | 1                       | 0.305                   | /                       |
| P4R2 | 2                       | 0.775                   | 0.935                   |

Figure 10:
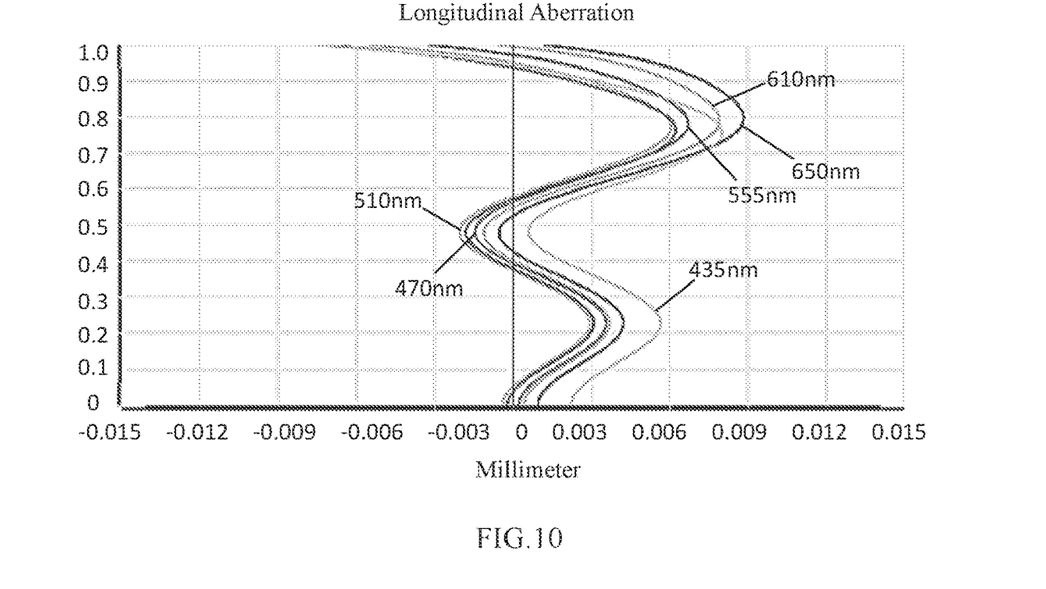
FIG. 10 is a schematic diagram of a longitudinal aberration of the camera optical lens shown in FIG. 9.
Figure 11:
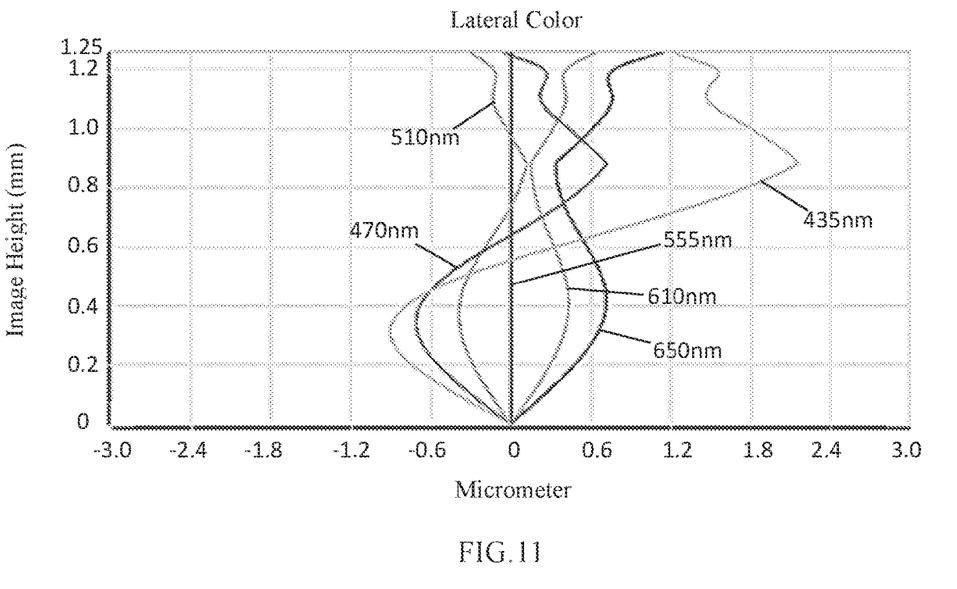
FIG. 11 is a schematic diagram of a lateral color of the camera optical lens shown in FIG. 9.
Figure 12:
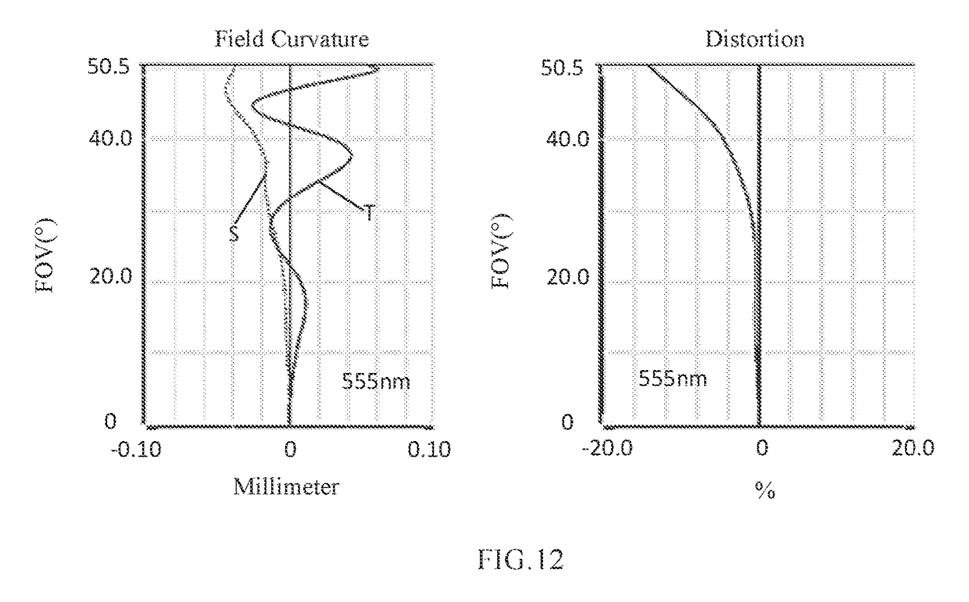
FIG. 12 is a schematic diagram of a field curvature and a distortion of the camera optical lens shown in FIG. 9.

FIG. 10 and FIG. 11 are schematic diagrams of a longitudinal aberration and a lateral color after light having a wavelength of 650 nm, 610 nm, 555 nm, 510 nm, 470 nm, and 435 nm passes through the camera optical lens 30 according to Embodiment 3. FIG. 12 is a schematic diagram of a field curvature and a distortion of the camera optical lens 30 after light having a wavelength of 555 nm passes through the camera optical lens 30 according to Embodiment 3.

Table 13 below shows numerical values corresponding to each condition in this embodiment according to the above conditions. It is appreciated that, the imaging optical system in this embodiment satisfies the above conditions.

In this embodiment, an entrance pupil diameter ENPD of the camera optical lens is 0.590 mm, a full-field image height IH is 1.260 mm, and a field of view FOV in a diagonal direction is 101.00°. The camera optical lens 30 satisfies design requirements for large aperture and wide angle. Its on-axis and off-axis chromatic aberrations are fully corrected, thereby achieving excellent optical performances.

TABLE 13

| Parameters and conditions | Embodiment 1 | Embodiment 2 | Embodiment 3 |
|---|---|---|---|
| f1/f | −1.54 | −1.20 | −2.99 |
| f2/f | 7.04 | 8.99 | 4.02 |
| R4/R3 | 27.48 | 15.08 | 14084763.92 |
| R7/R8 | 3.87 | 5.99 | 2.50 |
| d5/d6 | 14.78 | 19.97 | 10.18 |
| f | 1.232 | 1.217 | 1.209 |
| f1 | −1.892 | −1.465 | −3.614 |
| f2 | 8.677 | 10.946 | 4.857 |
| f3 | 0.807 | 0.722 | 0.905 |
| f4 | −1.182 | −1.035 | −1.320 |
| f12 | −2.519 | −1.722 | −20.586 |
| FNO | 2.01 | 2.05 | 2.05 |
| TTL | 3.421 | 3.355 | 3.031 |
| IH | 1.260 | 1.260 | 1.260 |
| FOV | 103.00° | 104.40° | 101.00° |

The above are only preferred embodiments of the present disclosure. Here, it should be noted that those skilled in the art may make modifications without departing from the inventive concept of the present disclosure, but these shall fall into the protection scope of the present disclosure.

What is claimed is:

1. A camera optical lens, comprising four lenses, wherein from an object side to an image side:
a first lens having negative refractive power;
a second lens having positive refractive power;
a third lens having positive refractive power; and
a fourth lens having negative refractive power,
wherein the camera optical lens satisfies following conditions:

$-3.00 \leq f1/f \leq -1.20$;

$4.00 \leq f2/f \leq 9.00$;

$15.00 \leq R4/R3$;

$2.50 \leq R7/R8 \leq 6.00$; and $10.00 \leq d5/d6 \leq 20.00$, where
f denotes a focal length of the camera optical lens;
f1 denotes a focal length of the first lens;
f2 denotes a focal length of the second lens;
R3 denotes a central curvature radius of an object side surface of the second lens;
R4 denotes a central curvature radius of an image side surface of the second lens;
R7 denotes a central curvature radius of an object side surface of the fourth lens;
R8 denotes a central curvature radius of an image side surface of the fourth lens;
d5 denotes an on-axis thickness of the third lens; and
d6 denotes an on-axis distance from an image side surface of the third lens to the object side surface of the fourth lens.

2. The camera optical lens as described in claim 1, wherein the camera optical lens further satisfies a following condition:

$0.50 \leq d1/d2 \leq 1.20$, where
d1 denotes an on-axis thickness of the first lens; and
d2 denotes an on-axis distance from an image side surface of the first lens to the object side surface of the second lens.

3. The camera optical lens as described in claim 1, wherein the camera optical lens further satisfies following conditions:

$0.03 \leq (R1+R2)/(R1-R2) \leq 2.83$; and $0.03 \leq d1/TTL \leq 0.16$, where
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image plane of the camera optical lens along an optic axis.

4. The camera optical lens as described in claim 1, wherein the camera optical lens further satisfies following conditions:

$-2.28 \leq (R3+R4)/(R3-R4) \leq -0.67$; and $0.07 \leq d3/TTL \leq 0.38$, where
d3 denotes an on-axis thickness of the second lens; and
TTL denotes a total optical length from an object side surface of the first lens to an image plane of the camera optical lens along an optic axis.

5. The camera optical lens as described in claim 1, wherein the camera optical lens further satisfies following conditions:

$0.30 \leq f3/f \leq 1.12$;

$-0.42 \leq (R5+R6)/(R5-R6) \leq 0.01$; and $0.08 \leq d5/TTL \leq 0.33$, where
f3 denotes a focal length of the third lens;
R5 denotes a central curvature radius of an object side surface of the third lens;
R6 denotes a central curvature radius of the image side surface of the third lens; and
TTL denotes a total optical length from an object side surface of the first lens to an image plane of the camera optical lens along an optic axis.

6. The camera optical lens as described in claim 1, wherein the camera optical lens further satisfies following conditions:

$-2.18 \leq f4/f \leq -0.57$;

$0.70 \leq (R7+R8)/(R7-R8) \leq 3.49$; and $0.03 \leq d7/TTL \leq 0.12$, where
f4 denotes a focal length of the fourth lens;
d7 denotes an on-axis thickness of the fourth lens; and
TTL denotes a total optical length from an object side surface of the first lens to an image plane of the camera optical lens along an optic axis.

7. The camera optical lens as described in claim 1, wherein the camera optical lens further satisfies a following condition:

$FNO \leq 2.05$, where FNO denotes an F number of the camera optical lens.

8. The camera optical lens as described in claim 1, wherein the camera optical lens further satisfies a following condition:

$FOV \geq 101°$, where FOV denotes a field of view of the camera optical lens.

9. The camera optical lens as described in claim 1, wherein the camera optical lens further satisfies a following condition:

$-34.05 \leq f12/f \leq -0.94$, where f12 denotes a combined focal length of the first lens and the second lens.

10. The camera optical lens as described in claim 1, wherein the camera optical lens further satisfies a following condition:

$TTL \leq 3.76$ mm, where TTL denotes a total optical length from an object side surface of the first lens to an image plane of the camera optical lens along an optic axis.

* * * * *